Patented Aug. 17, 1943

2,326,882

UNITED STATES PATENT OFFICE 2,326,882

TREATING PETROLEUM OILS

William E. Perdew, Kechi Township, Sedgwick County, Kans., assignor, by mesne assignments, to Globe Oil and Refining Company, Wichita, Kans., a corporation of Kansas No Drawing. Application April 5, 1940, Serial No. 328,097

22 Claims. (Cl. 252—330)

This invention relates to a process of treating petroleum oils, and more particularly to a process of dehydrating, demulsifying, or desalting petroleum oils containing emulsions or suspensions of fresh or salty water, or solids.

The petroleum oil treated in accordance with the present invention may be any type which contains water incorporated therewith in the form of an emulsion or suspension, which water may or may not contain substantial amounts of salts. The petroleum oil treated also may contain solids in suspension. Such oils as may be treated in accordance with the present invention are, for example, bottom settlings from crude oils, separator slop, and crude oils. The process lends itself particularly to the dehydrating and desalting of crude oils. The presence of salt in such oils is particularly undesirable where the oil is to be subjected to a refining process, since the oil undergoing treatment has a tendency to incrust the heat exchangers and still tubes, and to cause corrosion in the distillation equipment.

Therefore, it is one object of this invention to provide a new and improved process for desalting and dehydrating petroleum oils.

Further and additional objects will appear from the following description and the accompanying claims.

In accordance with the present process, suspended solids, salts dissolved in water, and water may be removed from a petroleum oil with a proportionately small volume of fresh or comparatively pure water to which has been added a controlled amount of an alkali, alkaline salt, acid, or acid salt, as the case may be, in order to control between any desired limits the pH of the water then in the mixture. The mixture is then heated under sufficient pressure to prevent vaporization of either oil or water, and the heated liquid mixture introduced into a body of water under the surface thereof, whereby the oil rises to the surface in individual droplets or small streams, while the salty water and solids become separated therefrom. The hot oil thus separated and collected above said water surface may be passed to a further separating zone and then directly to equipment of a refining process.

For a more complete understanding of this invention, the process may be carried out as follows: A dilute aqueous solution of soda ash is mixed with the oil to be treated, suitable proportions being 5% by volume of solution and 95% by volume of the oil. If surplus exhaust steam or other heat is available, this solution may be heated advantageously before mixing it with the oil. The amount of soda ash or other reagent added is such that the pH of the hot water withdrawn from the washing vessel is maintained between the limits which afford the best operation. The amount of fresh water, containing the soda ash or other reagent, that it is necessary to add in order to produce the purification desired, may vary between as low as 1% by volume of the oil being treated and as high as 15%. Obviously it is desirable to keep at a minimum the amount of fresh water added, because of the cost of the latter, and also because of the frequent problem of disposal of the wash water, cost of larger equipment for handling larger volumes of water, and heat loss in the larger volumes of discarded hot water, unless relatively expensive heat exchange equipment is put in. The resulting mixture is then heated in a suitable heating zone, which may be a heat exchanger, to about 250° F., under sufficient pressure to prevent vaporization of either the water or the oil constituents. The heated mixture is then introduced in a well dispersed state under the surface of a body of hot water contained in a washing vessel also maintained under sufficient pressure to prevent ebullition. It is desirable to distribute uniformly over the entire horizontal cross-section of the washing vessel the mixture of oil and water containing the reagent, so that the oil will rise through the column of water, maintained above the point of introduction, in many uniformly distributed droplets or small streams. To accomplish this I use a spider of perforated pipe. Any other distributing system can be used. Droplets or thin streams of oil are formed in the hot water and rise therein to the surface thereof, whereby the oil is thoroughly washed; and the water, containing the salt and soda ash or other reagent in solution, and solids if any in suspension, becomes separated therefrom. Desired results may be obtained by permitting the oil droplets or streams to rise through a 20-foot high layer of water. However, any sufficient height may suffice, providing the desired washing of the oil takes place. The oil collecting above the surface of the water then may be collected continuously and passed to a further settling vessel, or direct to a refining process, or through coolers to storage, if desired. Hot water is continuously or intermittently withdrawn from the washing chamber, through which the oil droplets or streams are passed, at such rates and in such a manner as to keep the interface of oil and water maintained in the upper part of the vessel at approximately a constant level or between whatever limits are desired.

It is clear that the above description is merely an example of a process embodying the present invention. Conditions may be controlled depending on the type of oil being treated and the degree of purification desired. Any suitable quantities of wash water containing any suitable concentration of reagent may be employed for treating the oil, consistent with the intended results. For example, I have found soda ash a cheap and satisfactory reagent with crude oils produced in Central and West Kansas, using 65 pounds of commercial soda ash per 1000 barrels of crude oil containing approximately 200 pounds of salt per 1000 barrels, and obtaining a salt reduction of approximately 90% when adding the soda ash solution at the rate of approximately 50 barrels per 1000 barrels of crude oil, and maintaining the causticity of the water withdrawn from the washing vessel between 10 and 30 grains per gallon. The temperature of the contents of the washing vessel in this operation is maintained at approximately 250° F., and the pressure at approximately 125 pounds per square inch, gauge.

While soda ash has been found to be particularly useful, other water soluble alkaline compounds may be used. To purify oils different from the one given in the above example, a water soluble acidic compound, such as for example sulfuric acid, hydrochloric acid or phosphoric acid may be used.

While a particular embodiment of this invention is described above, it will be understood, of course, that the invention is not to be limited thereto since many modifications may be made, and it is contemplated, therefore, by the appended claims, to cover any such modifications as fall within the true spirit and scope of this invention.

I claim:

1. A method of desalting and demulsifying an oil which comprises mixing less than 15 parts by volume of an aqueous solution with 85 parts by volume of said oil, heating the resulting mixture, introducing the heated mixture containing less than 15 per cent by volume of water under the surface of a body of water whereby the oil rises to the surface thereof, and collecting the resulting oil, said aqueous solution having an electrolyte dissolved therein selected from the group consisting of the acid reacting materials and the alkaline reacting materials.

2. The method of claim 1 in which said electrolyte is soda ash.

3. A method of desalting and demulsifying an oil which comprises mixing an aqueous solution with said oil, heating the resulting mixture, introducing the heated mixture under the surface of an unobstructed vertical column or water whereby the oil rises vertically in a substantially straight path to the surface thereof, said column of water being of sufficient height to effect a substantially complete washing of the oil passing therethrough, and collecting the resulting oil, said aqueous solution having an electrolyte dissolved therein selected from the group consisting of the acid reacting materials and the alkaline reacting materials.

4. The method of claim 3 in which said electrolyte is soda ash.

5. A method of desalting and demulsifying an oil which comprises mixing an aqueous solution with said oil, heating the resulting mixture under pressure to a temperature above the normal boiling point of water but without substantial vaporization of the mixture, introducing the heated mixture under pressure under the surface of an unobstructed vertical column of water whereby the oil therein rises vertically in a substantially straight path to the surface thereof, said column of water being of sufficient height above the point of introduction of the mixture to effect a substantially complete washing of the oil passing therethrough, and withdrawing the resulting oil collecting on the surface of said column of water, said aqueous solution having an electrolyte dissolved therein selected from the group consisting of the acid reacting materials and the alkaline reacting materials.

6. A method of desalting and demulsifying an oil which comprises mixing an aqueous solution with said oil, heating the resulting mixture under pressure to a temperature above the normal boiling point of water but without substantial vaporization of the mixture, introducing the heated mixture in dropwise fashion under pressure under the surface of an unobstructed vertical column of water whereby the oil drops introduced therein rise vertically in a substantially straight path to the surface thereof, said column of water being of sufficient height above the point of introduction of the mixture to effect a substantially complete washing of the oil drops passing therethrough, and withdrawing the resulting oil collecting on the surface of said column of water, said aqueous solution having an electrolyte dissolved therein selected from the group consisting of the acid reacting materials and the alkaline reacting materials in an amount sufficient to effect the desired desalting and demulsifying.

7. The method of claim 6 wherein said electrolyte is an alkaline reacting material.

8. The method of claim 6 wherein said electrolyte is soda ash.

9. A method of desalting and demulsifying an oil containing water admixed therewith which comprises heating said oil under pressure to a temperature above the normal boiling point of water, introducing it while under at least a pressure sufficient to prevent boiling of the water beneath the surface of an unobstructed vertical column of an aqueous solution whereby the oil rises vertically in a substantially straight path to the surface thereof, said column of solution being of sufficient height to effect a substantially complete washing of the oil passing therethrough, and collecting the resulting oil, said aqueous solution having an electrolyte dissolved therein selected from the group consisting of the acid reacting materials and the alkaline reacting materials.

10. The method of claim 9 wherein the oil being treated is heated to a temperature above the normal boiling point of water and at a superatmospheric pressure such that substantially no vaporization occurs and wherein the column of solution is also held under superatmospheric pressure.

11. The method of claim 9 wherein said oil is introduced into the aqueous solution in dropwise fashion.

12. The method of claim 9 wherein said oil contains less than 15 per cent by volume of water prior to introduction into the aqueous solution.

13. The method of claim 9 wherein said electrolyte comprises soda ash.

14. The method of claim 1 wherein said electrolyte is an acid.

15. The method of claim 1 wherein said electrolyte is sulfuric acid.

16. The method of claim 6 wherein said electrolyte is an acid.

17. The method of claim 6 wherein said electrolyte comprises sulfuric acid.

18. A method of desalting and demulsifying an oil containing less than 15% by volume of water admixed therewith which comprises heating said oil under pressure to a temperature above the normal boiling point of water, and introducing it while under at least a pressure sufficient to prevent boiling of the water under the surface of a body of water whereby the oil rises to the surface thereof, and collecting the resulting oil, said body of water having dissolved therein an electrolyte selected from the group consisting of the acid reacting materials and the alkaline reacting materials.

19. The method of claim 18 wherein said electrolyte is soda ash.

20. The method of claim 18 wherein said electrolyte is sulfuric acid.

21. The method of claim 18 wherein the oil being treated is heated to a temperature above the normal boiling point of water and at superatmospheric pressure such that substantially no vaporization occurs and wherein the body of water is also maintained under superatmospheric pressure.

22. The method of claim 1 wherein the oil being treated is heated to a temperature above the normal boiling point of water and at superatmospheric pressure such that substantially no vaporization occurs and wherein the body of water is also maintained under superatmospheric pressure.

WILLIAM E. PERDEW.